Figure 1:
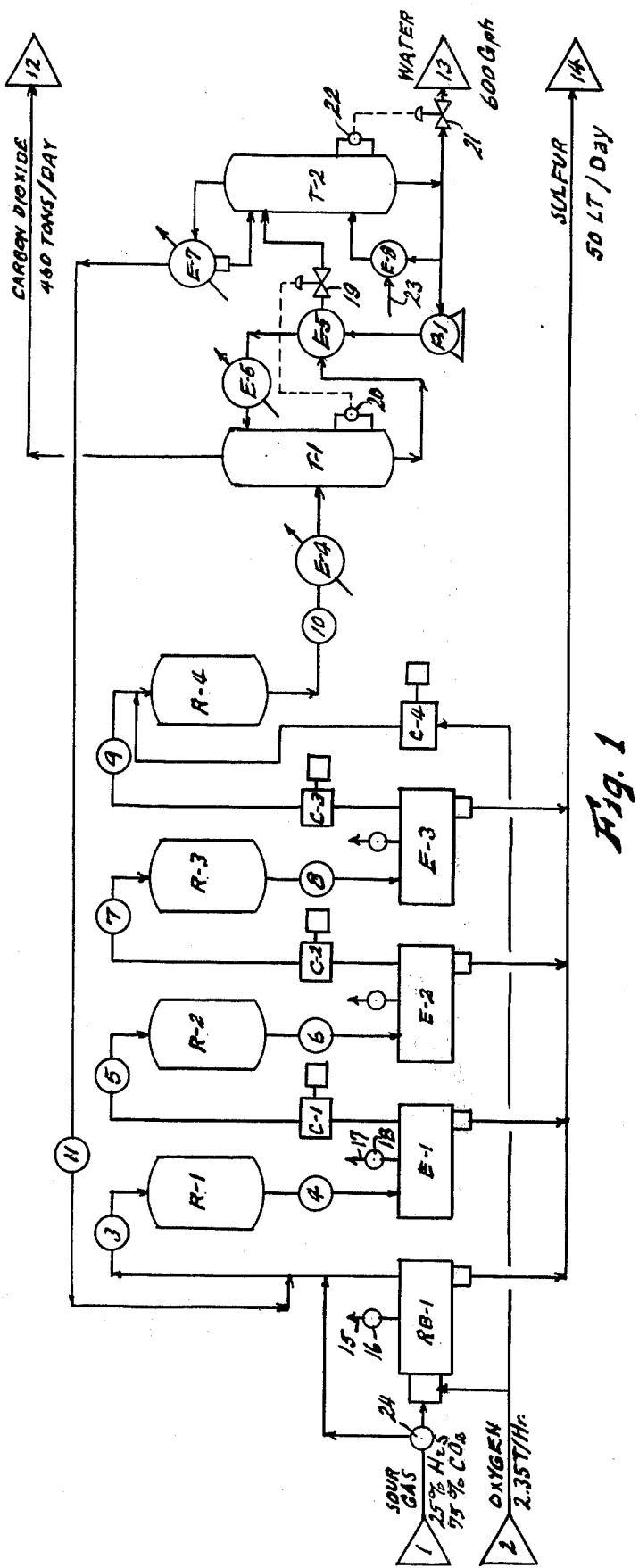

United States Patent [19]

Gieck

[11] 4,138,473
[45] Feb. 6, 1979

[54] PROCESS FOR RECOVERING SULFUR FROM SOUR GAS

[76] Inventor: Joseph F. Gieck, 12887 Cambridge Cir., Leawood, Kans. 66209

[21] Appl. No.: 847,240

[22] Filed: Oct. 31, 1977

[51] Int. Cl.$^2$ ............................................. C01B 17/04
[52] U.S. Cl. .................................. 423/574 R; 423/576
[58] Field of Search ....................... 423/573, 574, 576; 23/262

[56] References Cited

U.S. PATENT DOCUMENTS

| | | | |
|---|---|---|---|
| 2,415,904 | 2/1947 | Odell | 423/573 G X |
| 3,532,468 | 10/1970 | Beavon | 423/574 |
| 3,681,204 | 8/1972 | Hujsak et al. | 423/574 |
| 3,822,341 | 7/1974 | Smith | 423/574 |
| 3,895,101 | 7/1975 | Tsuruta | 423/574 |

*Primary Examiner*—G. O. Peters
*Attorney, Agent, or Firm*—John A. Hamilton

[57] ABSTRACT

A process for recovering sulfur from sour gas, and providing valuable byproducts, the sour gas consisting principally of hydrogen sulfide and carbon dioxide, and the process consisting of the steps of combusting a portion of the hydrogen sulfide with pure oxygen to produce a mixture of $H_2S$ and $SO_2$, reacting the mixture successively over a series of catalytic converter beds wherein they react to produce water and elemental sulfur, the elemental sulfur being condensed after each converter, and the gaseous output of each converter being repressurized and reheated before entering the next successive converter to improve the yield of sulfur therein, combusting the gaseous output of the final converter of the series with pure oxygen in a final catalytic converter to convert any remaining $H_2S$ to $SO_2$, and treating the $H_2O$, $SO_2$ and $CO_2$ mixture emerging from said converter to remove therefrom the water and $CO_2$, which are in themselves valuable byproducts and recycling the $SO_2$ to the beginning step of the process, both to permit further recovery of the its sulfur content, and also to reduce the oxygen requirement in the first step of the process.

4 Claims, 2 Drawing Figures

50 LONG TONS/DAY SULFUR

| LINE NO. | ① | ② | ③ | ④ | ⑤ | ⑥ | ⑦ | ⑧ | ⑨ | ⑩ | ⑪ | ⑫ | ⑬ | ⑭ |
|---|---|---|---|---|---|---|---|---|---|---|---|---|---|---|
| COMMODITY | SOUR GAS | OXYGEN | IN R-1 | OUT R-1 | IN R-2 | OUT R-2 | IN R-3 | OUT R-3 | IN R-4 | OUT R-4 | RECYCLE | PRODUCT $CO_2$ | PRODUCT $H_2O$ | PRODUCT SULFUR |
| M lbs/Hour | 48,357 | 4,692 | 58,852 | 58,852 | 51,420 | 51,420 | 49,880 | 49,880 | 49,833 | 49,833 | 6,082 | 38,559 | 5,192 | 9,299 |
| PSIA | 25-30 | 25-30 | 22 | 21 | 55 | 54 | 140 | 139 | 385 | 384 | | | | |
| °F | 100 | 60 | 450 | 670 | 475 | 520 | 475 | 485 | 475 | 565 | | | | |
| MOLS PER HOUR $O_2$ | | 146.64 | | | | | | | 8.73 | | | | | |
| $H_2S$ | 291.12 | | 199.18 | | 44.64 | 12.62 | 12.62 | 5.82 | 5.82 | | | | | |
| $SO_2$ | | | 99.59 | 22.32 | 22.32 | 6.31 | 6.31 | 2.91 | 2.91 | | 7.65 | 1.08 | | |
| $H_2O$ | | | 188.98 | 343.52 | 343.52 | 375.54 | 375.54 | 382.34 | 382.34 | 388.16 | 97.04 | 2.91 | 288.21 | |
| $CO_2$ | 873.36 | | 960.70 | 960.70 | 960.70 | 960.70 | 960.70 | 960.70 | 960.70 | 960.70 | 87.34 | 873.36 | | |
| S | | | | 231.81 | | 48.03 | | 10.20 | | | | | | 290.04 |
| TOTAL Mph | 1,164.48 | 146.64 | 1,448.45 | 1,602.99 | 1,371.18 | 1,403.20 | 1,355.17 | 1,361.96 | 1,360.50 | 1,357.60 | 192.03 | 877.35 | 288.22 | 290.04 |

Fig. 2

PROCESS FOR RECOVERING SULFUR FROM SOUR GAS

This invention relates to new and useful improvements in processes for recovering elemental sulfur from sour gases containing hydrogen sulfide, $H_2S$, and carbon dioxide, $CO_2$. The present process is suitable for use on any gas mixture containing $H_2S$, but is particularly intended for use on mixtures containing a high percentage of $CO_2$ and a low percentage of $H_2S$. The present process makes use of the basic Claus process, now regarded as standard for this purpose, but with several important modifications and additions.

In the basic Claus process, one-third of the $H_2S$ in the gas mixture is combusted with air in a reaction boiler to produce $H_2S$ and $SO_2$ in a ratio of 2:1. This mixture is then reacted over 2 or 3 successive catalyst converter beds in which the following reaction occurs:

$$2H_2S + SO_2 = 2H_2O + 3S.$$

The sulfur is then in vapor form, and is condensed after each converter. The gaseous output of each converter is usually reheated by some suitable in-line heater before entering the next converter, in order to improve the yield of sulfur therein. The yield of elemental sulfur is generally 90–95% of that contained in the feed gas, but the process has certain shortcomings:

1. The reaction pressure at each successive catalytic converter drops, thereby reducing the equilibrium amount of sulfur formed in that converter.
2. It uses air, which introduces nitrogen into the system. The nitrogen reduces the sulfur yield by reducing the partial pressure of the reacting gases in the converters, and inhibits the production of pure $CO_2$ as a byproduct, since it follows the $CO_2$ through the system and is very difficult to strip from the $CO_2$.
3. The waste gases from the process usually contain about 1% of unconverted $H_2S$, which is highly noxious and must be incinerated or otherwise specially treated for disposal.

An important object of the present invention is the provision of a sulfur recovery process of the general character involved in the Claus system, but with improvements enabling it to recover, in elemental form, over 99.5% of the sulfur contained in the feed gas. This object is accomplished by the use of pure oxygen rather than air in the initial combusiton step of the process, thereby eliminating nitrogen from the system, by reheating and repressurizing the exhaust of the gaseous mixture leaving each catalytic converter before it enters the next successive converter, whereby to maintain optimum reaction conditions at each converter, and by recycling any sulfur remaining in the gaseous mixture after it leaves the last converter of the series back to the start of the process for further recovery of its sulfur content.

Another object of the present invention is the provision of a process of the character described having special provisions whereby it produces water and carbon dioxide of high purity as byproducts. Generally, this object is accomplished by the use of oxygen rather than air to eliminate nitrogen from the system, combusting any remaining $H_2S$ remaining in the effluent gases of the final converter of the series with pure oxygen and reacting it in an additional deoxo catalytic converter to change it to $SO_2$, and separating the $H_2O$, $CO_2$ and $SO_2$ components of the effluent of the deoxo converter, the $H_2O$ and $CO_2$ being drawn off as valuable byproducts, and the $SO_2$ being returned to the start of the process both to reduce the oxygen requirements at that point, and to permit further recovery of its sulfur content.

Other objects are simplicity and economy of concept, efficiency and dependability of operation, and adaptability to use readily available and relatively economical structural components.

With these objects in view, as well as other objects which will appear in the course of the specification, reference will be had to the accompanying drawing, wherein:

FIG. 1 is a flow chart illustrating a process for recovering elemental sulfur from sour gas, and providing water and carbon dioxide of high purity as useful byproducts, as contemplated by the present invention, and FIG. 2 is a table giving the amounts, temperatures, pressures and other data as to the materials being treated, at designated points in the flow chart of FIG. 1.

The exemplary figures given in both the flow chart of FIG. 1 and the table of FIG. 2 are those which would occur in a typical recovery unit capable of producing 50 long tons of elemental sulfur per 24 hour day, using a feed gas composed of 25% $H_2S$ and 75% $CO_2$. The $CO_2$ remains substantially inert throughout the process. Referring first to FIG. 1, the sour gas enters at 1, and essentially pure oxygen enters at 2, both of these gases entering a reaction boiler RB-1, wherein combustion occurs to convert one-third of the $H_2S$ content to provide $H_2S$ and $SO_2$ in the ratio of 2:1. The $H_2S$, $SO_2$, and $CO_2$ emerging from RB-1 are transported through line 3 to a catalytic converter R-1, using a catalyst, for example of a bauxite type, wherein a portion of the $H_2S$ and $SO_2$ react to produce water elemental sulfur in the following reaction:

$$2H_2S + SO_2 = 2H_2O + 3S$$

The boiler is externally supplied with cooling feed water, and a portion of this feed water is converted to steam by the heat of combustion. This steam may be bled off at 15 to perform other useful functions, which constitutes the steam as another useful byproduct of the process. A pressure relief valve 16 maintains a safe pressure within the boiler.

Thus the effluent leaving converter R-1 consists of water, now in the form of steam, elemental sulfur in vapor form, unreacted $H_2S$ and $SO_2$, and the inert $CO_2$, and passes through line 4 to a first condenser E-1, cooled by externally supplied water, wherein the sulfur vapor is condensed and removed to line 14 as product sulfur, this condensation occuring at a much higher temperature than required to condense the process steam, while any steam generated from the cooling water is bled off at 17 under the control of a pressure relief valve 18. The process steam, together with the still unreacted $H_2S$ and $SO_2$ and the inert $CO_2$, pass through line 5 to a first power driven compressor C-1 in which they are compressed, and in the process of being compressed are heated, to the desired reaction pressure and temperature, and thence to a second catalytic converter R-2, wherein additional quantities of the $H_2S$ and $SO_2$ are reacted to produce more water and elemental sulfur. The effluent of converter R-2 then passes, in a similar manner, through line 6 to a second condenser E-2 in which additional elemental sulfur is condensed and passed to line 14 as product sulfur, then through line 7 through a second compressor C-2 to a third catalytic converter R-3, in which still more of the $H_2S$ and $SO_2$ are reacted to form water and elemental sulfur, and thence through line 8 to a third condenser E-3, where the sulfur is again condensed and passed to product line 14. Additional converters could be used, but by this time over 99.5% of the sulfur content of the feed gas has been recovered and additional converters would provide little return.

The compressors C-1 and C-2 are necessary to maintain the desired reaction temperatures and pressures of the reacting $H_2S$ and $SO_2$ gases as they enter each successive converter. Their reaction is exothermic, so that the temperature of the mixture rises in each converter, but the temperature drops below that desired (about 475 deg. Fahr. in this case) in the succeeding condenser, and therefore it must be reheated. On the other hand, the pressure in each succeeding converter must be increased, in order to compensate for the fact that the partial reaction of the gases in preceding converters has reduced their partial pressures in the mixture. Compressors C-1 and C-2 provide the necessary increased pressures, and in performing the compression also supply the necessary reheating by the heat of compression.

Thus any small remaining amount of unreacted $H_2S$ and $SO_2$, together with steam and $CO_2$, emerge from condenser E-3 through line 9. This mixture is again compressed by a third compressor C-3 and delivered to a fourth deoxo catalytic converter R-4, being mixed with pure oxygen from line 2 before it enters said converter, said gas being compressed by a gas compressor C-4 to a pressure sufficiently high to inject it into line 9. The gas mixture is therefore combusted with the oxygen, and with the aid of converter R-4, all of the remaining $H_2S$, or any other sulfur compounds, are reduced to $SO_2$, so that only $SO_2$, $CO_2$ and steam emerge from converter R-4 to line 10. This mixture is then passed through a gas cooler E-4, which is a heat exchanger cooled by a suitable external fluid medium, wherein the mixture is reduced to about 100 deg. Fahr. This condenses the steam to water, so that water, $SO_2$ and $CO_2$ emerge from the cooler.

The mixture emerging from gas cooler E-4 enters the bottom portion of an absorber T-1 comprising a tower through which relatively cold water is trickled or otherwise passed downwardly by gravity. Of the gases rising from the water inserted into the absorber, the $CO_2$ is only very slightly soluble in water, and hence it rises through the tower and a stream of high purity $CO_2$ is passed from the top of the tower to line 12 as a useful and valuable byproduct of the process. $SO_2$, on the other hand, is relatively extremely soluble in water, and is readily absorbed therein. The water is recirculated between absorber T-1 and a stripper T-2, the latter constituting a tower through which the process water from the absorber is trickled downwardly. Water from the bottom of the absorber is forced by the pressure in the absorber through a heat exchanger E-5 in which it constitutes the cooler medium, and is therefore heated therein, and through a flow regulating valve 19 which is regulated by a liquid level control device 20 of the absorber to maintain a constant liquid level in the absorber by passing more or less of the process water to the stripper. Water is circulated from the bottom of the stripper tower back to the top of the absorber tower by a water pump P-1, through heat exchanger E-5, wherein it is the hotter medium and is therefore cooled therein, and through a cooler E-6, in which the water is further cooled. Water is drawn from the bottom of the stripper through a steam heated reboiler E-8, and returned thereto, by the siphonic action of said reboiler. Driving steam is supplied to the reboiler at 23. Steam bled from boiler RB-1, and condensers E-1, E-2 and E-3, is an ideal source of steam for driving reboiler E-8, although only a small portion of the steam is required for this purpose, leaving steam as a useful byproduct of the process. The water returned to the stripper by the reboiler serves to maintain the stripper water boiling. The bottom of the stripper tower is also connected to a line 13 representing product water, through a flow-regulating valve 21, which in turn is regulated by a level-responsive control device 22 of the stripper tower. Whenever water manufactured in the process tends to raise the liquid level in the stripper above the control level, valve 21 is opened by control device 22 to pass the excess water to line 13 as product water. This water is of high purity, and represents a valuable byproduct of the process, in that it may be used as boiler feed water, or other purposes requiring water of such purity.

Thus the water is constantly recirculated between the absorber T-1 and stripper T-2, being relatively cold in the absorber and relatively hot in the stripper, in order that in the absorber $CO_2$ is removed therefrom, but no $SO_2$, due to the high solubility of the latter in water, while in the stripper the $SO_2$ is stripped therefrom due to its elevated temperature. $SO_2$ stripped from the water at T-2, together with steam, rises to the top of the tower, and is led off to line 11 through an overhead condenser E-7 in which the steam is condensed therefrom and the condensate returned to the stripper. The $SO_2$ is returned by line 11 to the start of the process, where it may be fed into line 3 downstream of reaction boiler RB-1. It could also be fed to the input of reaction boiler RB-1. The feed gas may be fed directly to the reaction boiler, or partially bypassed therearound to line 3, under the control of a proportioning valve 24.

The return of the $SO_2$ to the beginning of the process serves useful purposes. It provides for disposal of the unwanted $SO_2$ from the byproducts of the process. It returns the $SO_2$ to a point at which it may be reacted directly with the $H_2S$ of the feed gas to produce elemental sulfur and water. The residual sulfur of the process is thus returned for recycling and further recovery of its sulfur content. Furthermore, it reduces the requirement for oxygen at RB-1 since less of the $H_2S$ must be combusted to produce the desired 2:1 ratio of $H_2S$ and $SO_2$. The pure oxygen supplied at 2 is of course an expense item in the process, and reduction of the requirement therefor is hence a valuable economy. Proportioning valve 24 is set to deliver only that portion of the feed gas which must be combusted to boiler RB-1, keeping in mind that this portion is reduced by the returned $SO_2$, and correlating it with the amount of pure $O_2$ supplied at 2 to provide a boiler flame of high temperature and good stability.

Thus it will be apparent that a process having several advantages over the usual Claus process has been provided. The use of pure oxygen for combusting the feed gas, rather than air as in the Claus process, provides a higher boiler flame temperature and improved flame stability, which in turn permits application of the process to feed gases having very low concentrations of $H_2S$, perhaps 10% or less. Feed gases of such low $H_2S$ content are difficult to combust efficiently with air. The use of oxygen rather than air also eliminates nitrogen from the system, which improves the yield of elemental sulfur by increasing the partial pressures of the reactant $H_2S$ and $SO_2$ in the system, and permits the process to produce commercially valuable byproducts of highly pure $CO_2$ and water. The use of compressors E-1 and E-2 between successive converters R-1, R-2 and R-3, to provide conversion at successively higher pressures (2 to 100 atmospheres), provides better reaction pressures at each converter and hence higher yields of elemental sulfur. Such pressurizing is not a part of the Claus process. The compressors, through the heat of compression also supply the desired reaction temperatures at each converter, and hence eliminate the need for the in-line heaters usually employed in the Claus process. The injection of oxygen after converter R-3, and the use of additional deoxo converter R-4, reduces all remaining sulfur and sulfur compounds to $SO_2$, which together with the $CO_2$ may be stripped from the water manufactured in the process, to provide byproducts of $CO_2$ and water of high purity, which are commercially valuable. The manufactured water itself is used as an absorption medium for removing the $SO_2$ from the exit gases. The recycling of the $SO_2$ to the inlet of converter R-1 permits a reduction in the oxygen requirement, which may be reduced while still maintaining the desired 2:1 ratio of $H_2S$ and $SO_2$ in view of the recycled $SO_2$.

While I have illustrated and described a specific embodiment of my process, it will be readily apparent that many minor changes and modifications thereof could be made without departing from the spirit of the invention.

What I claim as new and desire to protect by Letters Patent is:

1. A process for recovering elemental sulfur from a sour gas containing hydrogen sulfide, consisting of the successive steps of:
   a. combusting said sour gas in a suitable reaction boiler with oxygen to provide hydrogen sulfide and sulfur dioxide in a 2:1 ratio in the outlet stream of said boiler,
   b. passing the outlet stream of said boiler successively through a series of catalytic converters in each of which a portion of said H–S and $SO_2$ react to form elemental sulfur in vapor form and steam,
   c. condensing and removing said elemental sulfur from said stream after it passes through each of said converters, said stream being cooled during each condensation step, and
   d. reheating said stream after each condensation step but before it enters the next successive converter to elevate it to optimum reaction temperature, in order to improve the yield of elemental sulfur in said next successive converter, obtaining each successive reheat temperature by compressing the reaction gases at the proper compression ratio to obtain the desired reaction temperature.

2. A process as recited in claim 1 with the additional steps of:
   a. injecting pure oxygen into the flow stream after it emerges from the final converter and combusting it with said oxygen over an additional catalyst to oxidize all remaining sulfur and sulfur compounds to sulfur dioxide, and
   b. cooling the flow stream to near ambient temperature to condense the steam thereof to water form, said cooling step following the conversion of all sulfur compounds in the flow stream emerging from the final converter to sulfur dioxide, whereby said cooling step produces no solid sulfur which could plug the equipment and lines of the system.

3. A process as recited in claim 2 with the additional step of recirculating the water condensed from the flow stream in said cooling step in intimate contacting relation to the gaseous components of said flow stream, whereby the $SO_2$, being relatively highly soluble in water, is absorbed in said water and preserved for further recovery of its sulfur content, while any $CO_2$ present, being relatively poorly soluble in water, passes off in gaseous form and may be recovered as a useful byproduct of the process.

4. A process as recited in claim 3 with the additional steps of:
   a. heating the recirculating absorber water to strip the $SO_2$ therefrom,
   b. drawing off the stripped water as a useful by-product of the process, and
   c. returning the stripped $SO_2$ to the first converter of said series of converters to permit further recovery of the sulfur content thereof.

* * * * *